UNITED STATES PATENT OFFICE 2,343,162

SULPHOXIDES AND MORE PARTICULARLY SULPHOXIDES OF THE AROMATIC OR HETEROCYCLIC SERIES AND A METHOD OF MAKING THE SAME

Josef Vonkennel and Josef Kimmig, Kiel, Germany, assignors to Schering Corporation, Bloomfield, N. J., a corporation of New Jersey No Drawing. Application January 18, 1940, Serial No. 314,512. In Germany January 18, 1939

18 Claims. (Cl. 260—397.6)

This invention relates to sulphoxides and more particularly to sulphoxides of the aromatic or heterocyclic series and a method of making the same.

It is well known that the manufacture of sulphoxides is very difficult.

Now, we have found that therapeutically valuable sulphoxides of the aromatic and heterocyclic series can be prepared in a simple manner by condensing sulphinic acid amides of the aromatic and heterocyclic series with amino compounds of the aromatic and heterocyclic series preferably in the presence of halogen hydrides or salts of halogen hydrides with the corresponding amino compounds. Thereby, first, the corresponding substituted sulphinic acid amides are obtained, most probably by splitting off ammonia, which are then rearranged into the amino sulphoxides, it being understood that the para-position of the amino compounds is unsubstituted.

The probable course of the reaction may be illustrated by the following formulae in which p-acetylamino benzene sulphinic acid amide and aniline are used as starting materials:

(I) 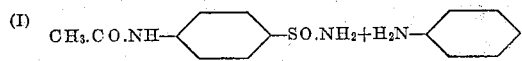

p-Acetylamino benzene sulphinic acid amide+aniline →

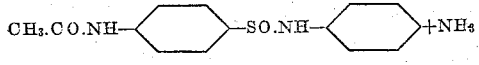

p-Acetylamino benzene sulphinic acid anilide

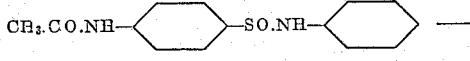

(II)

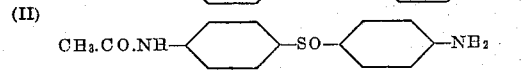

p-Acetylamino p'-amino diphenyl sulphoxide.

Instead of using p-acetylamino benzene sulphinic acid amide other sulphinic acid amides of the aromatic and heterocyclic series may likewise be employed likewise; especially valuable therapeutic compounds are obtained on using such benzene sulphinic acid amides as starting material which contain in p-position to the sulphinic acid amide group an amino group or a group convertible thereinto. In the place of aniline also other bases of the aromatic and heterocyclic series may be used as reaction component provided they contain an amino group or a group convertible thereinto which is capable of yielding ammonia together with the amino group of the sulphinic acid amide radical.

Instead of producing sulphinic acid anilide and the like compounds by causing aniline and like bases to react on sulphinic acid amides it is also possible to produce sulphinic anilides and the like compounds by causing aniline and the like bases to react on sulphinic acid halogenides, and converting the sulphinic anilides simultaneously or subsequently into sulphoxides by heating to higher temperature.

The p-acylamino benzene sulphinic acid amides and halogenides may be prepared, for example, as described in the application of the present applicants, Serial No. 196,906, by reducing, for example, acetylamino benzene sulphonic acid chloride (Berichte, vol. 42, page 3367 (1909)) to acetylamino benzene sulphinic acid, the latter being then converted into its acid chloride by means of, for example, thionyl chloride, the acid chloride being then reacted with ammonia to yield acetylamino benzene sulphinic acid amide.

The following examples serve to illustrate the reaction without, however, limiting the same to them.

Example 1

30 gs. of p-acetylamino benzene sulphinic acid amide are heated with 100 ccs. of aniline to which 2% of aniline chlorohydrate are added until the development of ammonia ceases and the reaction solution has become reddish-yellow in colour. After cooling the reaction mixture to 15° C. it is precipitated with ether, filtered off by suction, washed with water, and recrystallised from ethyl alcohol. Thus, p-acetylamino-p'-aminodiphenyl sulphoxide is obtained, which, by careful hydrolysis, is converted into the free diamino diphenyl sulphoxide.

Example 2

50 gs. of p-acetylamino benzene sulphinic acid chloride are added to aniline at room temperature. On moderate heating the reaction solution becomes reddish-violet in colour. As soon as this colour appears, the reaction mixture is cooled and added to ether and 2 N sodium hydroxide solution (1:1) whereby the aniline in excess passes into the ether. After separation of the two phases, the reaction product is filtered off. The p-acetylamino-p'-amino diphenyl sulphoxide obtained is dissolved in 2 N hydrochloric acid, precipitated with sodium hydroxide solution, filtered off, washed with water, and recrystallised from ethyl alcohol. Well-formed needles are obtained having a melting point of 206° C. The compound reacts with nitrous acid in hydrochloric acid solution. In alkaline solution the diazo compound obtained thereby couples to a fine azo dyestuff of deep red colour. After dissolving the same in 2 N hydrochloric acid and careful heating the free diamino diphenyl sulphoxide is obtained.

Instead of a p-acetylamino group another acylamino or a benzylamino, a carbalkoxyamino, a nitro or the like group may be employed likewise in order to protect the amino group of the sulphinic acid amide during the condensation reaction.

The condensation may also be carried out under pressure whereby care has to be taken that the ammonia developed during reaction may escape from time to time.

The new compounds represent valuable therapeutic products of very low toxicity.

Of course, many changes and variations may be made in the reaction conditions, the starting materials used, the temperature and duration of reaction, the methods of working up the reaction products, and the like by those skilled in the art in accordance with the principles set forth herein and in the claims annexed hereto.

What we claim is:

1. Method for the manufacture of aryl sulphoxides, comprising heating a phenyl sulphinic acid amide having in the p-position to the sulphinic acid amide group, a group hydrolyzable into the amino group, with a phenyl amine whose p-position is free, until condensation and rearrangement to the sulphoxide have taken place.

2. Method according to claim 1, wherein the condensation is effected with the aid of a halogen hydride.

3. Method according to claim 1, wherein the sulphinic acid amide is condensed with a halogen hydride salt of the phenyl amine.

4. Method according to claim 1, wherein the sulphinic acid amide has an organic acylamino group in the p-position.

5. In a method for the production of cyclic sulphoxides, the step which comprises heating and condensing a benzene sulphinic acid amide having in the p-position a group hydrolyzable into the amino group, with an amino benzene by splitting off ammonia from between the amide and amino groups.

6. In a method for the production of cyclic sulphoxides, the step which comprises heating a benzene sulphinic acid amide with an amino benzene until ammonia is split off.

7. A method according to claim 5, wherein the condensation is effected with the aid of a halogen hydride.

8. Method for the production of diphenyl sulphoxides, comprising heating p-acylamino benzene sulphinic acid amide with aniline in the presence of a hydrohalide the acyl group being that of a carboxylic acid.

9. Method for the production of diphenyl sulphoxides, comprising heating p-acetylamino benzene sulphinic acid amide with aniline in the presence of a hydrohalide.

10. Method according to claim 8, including the step of hydrolyzing the product to yield p,p'-diamino diphenyl sulphoxide.

11. Method for the production of diphenyl sulphoxides, comprising heating a benzene sulphinic acid amide having in the p-position a nitro group, with aniline in the presence of a hydrohalide until approximately 1 mol of ammonia has been split off.

12. Method for the production of diphenyl sulphoxides, comprising heating a benzene sulphinic acid amide having in the p-position a substituted amino group hydrolyzable to the amino group, with aniline in the presence of a hydrohalide until approximately 1 mol of ammonia has been split off.

13. Method for the production of diphenyl sulphoxides comprising heating a compound of the general formula

wherein X is a group containing nuclearly bound nitrogen and selected from the class consisting of the amino group, substiuted amino groups hydrolyzable to the amino group, and nitro groups, and Y is a member of the class capable of splitting off with hydrogen and consisting of amino and halogen groups, with aniline.

14. Method for the production of diphenyl sulphoxides comprising reacting a p-acylamino benzene sulphinic acid chloride with aniline, the acyl group being that of a carboxylic acid.

15. Method according to claim 1, including the step of hydrolyzing the group in the p-position to the original sulphinic acid amide group into the amino group after the condensation.

16. Method for the production of bicyclic sulphoxides, comprising heating a phenyl sulphinic acid amide substituted in the amido group by a phenyl radical and having in the p-position a group hydrolyzable into the amino group, to effect rearrangement to the sulphoxide group.

17. Method according to claim 1, wherein rearrangement is effected with the aid of heat.

18. In a method for the production of cyclic sulphoxides, the step which comprises heating a phenyl sulphinic acid amide having in the p-position a group hylrolyzable into the amino group, with a phenyl amine whose p-position is free, until ammonia is split off and rearrangement of the residual NH group takes place.

JOSEF VONKENNEL.
JOSEF KIMMIG.